Patented Sept. 15, 1936

2,054,649

UNITED STATES PATENT OFFICE 2,054,649

PRODUCTION OF HIGHLY ELECTRO-POSITIVE METALS WITHIN SEALED VESSELS, SUCH, FOR EXAMPLE, AS THERMIONIC VALVES

Mark Benjamin, Wembley, England, assignor to The M-O Valve Company Limited, London, England No Drawing. Application April 4, 1935, Serial No. 14,636. In Great Britain April 12, 1934

6 Claims. (Cl. 250—27.5)

This invention relates to methods of producing deposits of the highly electro-positive metals (that is to say, the alkali and alkaline earth metals) within sealed vessels. A vessel is sealed when the atmosphere cannot penetrate to its interior; it need not be sealed off from a pump by which it is evacuated. More particularly it relates to the less volatile of these metals, namely, lithium, sodium, calcium, strontium and barium.

The main purposes for which highly electro-positive metals are introduced into sealed vessels are (a) gettering and (b) the formation of photo-electric cathodes. Both these purposes require that the metal should be deposited within the vessel in the form of a film with a clean surface; the generation of gas during the deposition is usually undesirable. The primary object of this invention is to provide methods specially adapted to these purposes.

The methods hitherto adopted are as follows:—
(1) Introduction of the uncombined metal, possibly covered by a protective film, and its evaporation by heat, (2) introduction of a relatively non-oxidizable alloy of the metal and evaporation of the metal by heat from the alloy, (3) introduction of a compound of the metal (usually the azide); its decomposition and subsequent evaporation of the metal by heat, (4) introduction of a compound of the metal mixed with a reducing agent (usually another metal) and simultaneous liberation and evaporation of the metal by heat.

In most of these methods the substance introduced into the vessel is more or less unstable when exposed to the atmosphere and has to be preserved out of contact with it. In method (3), when azide is used, the generation of gas necessarily accompanies the liberation of the metal, and in other methods it is apt to occur. We have found that these objections can be removed by liberating the metal from the product of certain reactions conducted outside the sealed vessel.

According to the invention a highly electro-positive metal is liberated in the form of vapour within a sealed vessel by heating within the said vessel a suitable aluminite produced outside the vessel. By an aluminite we mean here and hereinafter any compound, containing as essential constituents both a highly electro-positive metal and aluminium, and resulting from a chemical reaction between a suitable oxygen-containing compound of the metal and either aluminium or alumina. The most suitable oxygen-containing compounds are oxides or compounds readily converted to oxides, such as carbonates. The exact nature of the products resulting from such reactions has not been fully established; but it had been proved by X-ray analysis that the reactions described more particularly below result in the formation of crystal structures different from those of the original substances; for this reason the reaction is called chemical.

The metal whose oxygen-containing compound is used in producing the aluminite must, of course, be that which is to be liberated. If the simultaneous liberation of several metals is desired, a mixed aluminite may be used, produced from a mixture of oxygen-containing compounds of the several metals.

The sealed vessels must not, of course, contain so much active gas that all the metal liberated combines with the gas. Preferably the vessel is completely evacuated or filled with neutral gas to a pressure not greater than a few millimetres.

Certain methods of carrying the invention into effect will now be described by way of example.

When the metal to be liberated is barium, strontium, calcium or lithium, the corresponding oxide and aluminium, both finely powdered, are mixed in equimolecular proportions, that is to say, proportions such that the number of atoms of oxygen in the oxide is equal to the number of atoms of aluminium. The mixture is heated in hydrogen at atmospheric pressure for one hour at 1000° C. The resulting aluminite, which is grey or black is stable in air at room, and even higher, temperature. A portion of the aluminite is introduced into the sealed vessel, which is then exacuated to a pressure much less than one millimetre; the aluminite is heated, for example, by eddy currents induced in a metal member with which it is in thermal contact, to a temperature in the neighbourhood of 1000° C. The metal is then liberated at a rate which increases with the temperature, but very little gas is generated; the yield is not far from quantitative.

When the metal is sodium and the oxide is very unstable in air, the carbonate may be substituted for the oxide; it is again mixed with an equimolecular proportion of aluminium (that is to say, such that the number of $-CO_3$ radicles in the carbonate is equal to the number of atoms of aluminium) and heated in hydrogen to 1000° C. The product now contains carbon. This may be innocuous; but it can be removed, if necessary, by heating the product in air to a temperature just high enough to cause the carbon to burn.

Carbonate may also replace oxide in the production of barium, strontium, calcium and lithium; but no advantage appears to be gained by the replacement; the free carbon may be disadvantageous.

When the metal is sodium, but not when it is lithium, calcium, strontium or barium, the aluminium may be replaced by alumina containing the same number of Al atoms. X-ray analysis indicates that the same product is obtained as with aluminium. The aluminite formed is not identical, in its crystal structure or in its properties relevant to the invention, with the known sodium aluminate. Again the replacement appears to present no advantage.

When oxides, and not carbonates, of the metals are used, the aluminite may be produced by heating in a vacuum furnace instead of in hydrogen. A shorter period and lower temperature is then to be preferred; for example 15 minutes at 700° C. If the temperature is too high or the heating too long, metal will be lost. A considerable quantity of gas is usually evolved during the reaction and the furnace should therefore be continually pumped. It is this evolution of gas that makes it necessary, according to the invention, to produce the aluminite outside the sealed vessel, rather than to produce the aluminite and liberate the metal simultaneously within the vessel.

The function of the hydrogen is probably not to play a primary part in the reaction, but to reduce traces of carbonate which are always present in the commercial oxides, and to hinder the evaporation of the metal which would otherwise be liberated from the aluminite formed. Again the reason why the method according to the invention is more particularly applicable to the less volatile metals is now evident. It fails with the very volatile caesium because the metal, if it is formed at all, evaporates from the aluminite as soon as it is formed. Even with potassium the method is not generally convenient, although it is just practicable. On the other hand it is to be observed that the temperatures necessary to liberate the metal in the evacuated sealed vessel are far higher than they would be if the metals were present in the free form. Thus sodium evaporates freely at 200° C., but it is not liberated from the aluminite freely until about 1000° C.

When gettering is the purpose to which the invention is applied, the aluminite is conveniently made into pellets, which can then be used similarly to the known gettering pellets. Aluminium is then suitable as a binder for the pellets. 5% is sufficient; it may be added to the powdered aluminite after formation of the latter or it may be added in excess above the equimolecular proportions in the production of the aluminite. Its presence is in no way essential to the liberation of the electro-positive metal; it is not therefore present as a reducing agent and indeed its quantity is insufficient for that purpose. But it does sometimes increase the rate at which the metal is liberated at a given temperature, so that the temperature to which the aluminite is heated in the sealed vessel may be reduced.

If the purpose to which the invention is applied is the production of a photoelectric cathode (for instance of lithium), so that the deposition of the metal has to be confined to a prescribed area, the aluminite may conveniently be enclosed in a nickel tube closed at both ends with a small hole through which the vapour can emerge in the desired direction. The tube may be heated by an insulated coil wound on it, so that the temperature and therefore the rate of liberation may be controlled.

I claim:—

1. A process of producing a deposit of highly electro-positive metal within a sealed vessel which comprises producing outside the vessel a stable intermediate product by the reaction in hydrogen at about 1000° C. between aluminum and an oxygen containing compound of the electro-positive metal wherein the oxygen and aluminum are in substantially equi-molecular proportions, introducing this stable intermediate product into the sealed vessel, evacuating the sealed vessel, and heating the stable intermediate product so that the electro-positive metal is liberated.

2. A process according to claim 1 wherein in the first step the mixture of oxide and aluminum is heated to approximately 1000° C. in a vacuum furnace.

3. A process according to claim 1 in which the said oxygen containing compound is the carbonate, the proportion of aluminum to carbonate is approximately equi-molecular, and the mixture of carbonate and aluminum is heated to about 1000° C. in hydrogen at atmospheric pressure.

4. A process according to claim 1 wherein in the first step the oxygen containing compound is sodium carbonate and is mixed with alumina in approximately equi-molecular proportions and is heated in hydrogen at atmospheric pressure to about 1000° C.

5. A process according to claim 1 wherein between the first and second steps the stable intermediate product is mixed with about 5% of aluminum and formed into coherent pellets.

6. A process according to claim 1 wherein the stable intermediate product in the sealed vessel is heated to about 1000° C.

MARK BENJAMIN.